R. C. BOGUE.
AUTOMOBILE LAMP MOVING MECHANISM.
APPLICATION FILED JAN. 11, 1911.

1,002,490.

Patented Sept. 5, 1911.

2 SHEETS—SHEET 1.

Witnesses

Inventor
Reginald C. Bogue,
By Joshua R. H. Potts,
Attorney

R. C. BOGUE.
AUTOMOBILE LAMP MOVING MECHANISM.
APPLICATION FILED JAN. 11, 1911.
1,002,490.
Patented Sept. 5, 1911.
2 SHEETS—SHEET 2.
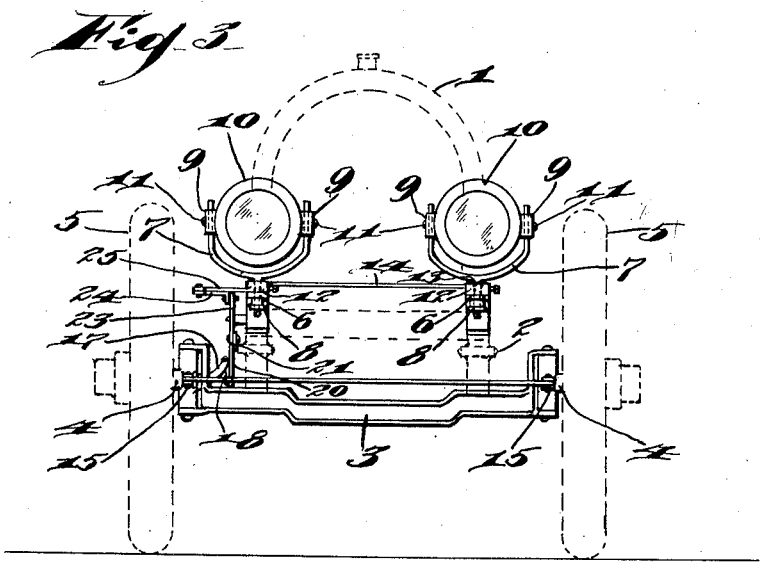
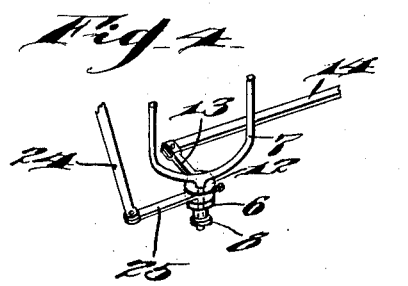
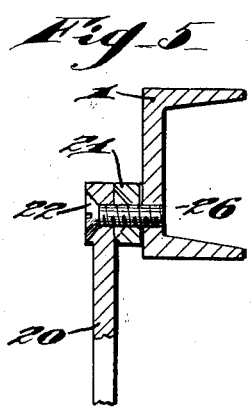
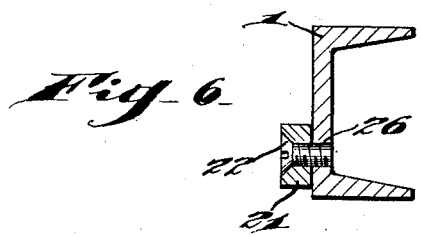
Witnesses
Inventor
Reginald C. Bogue,
By Joshua R. H. Potts,
Attorney ized view in section illustrating one of the
UNITED STATES PATENT OFFICE.

REGINALD C. BOGUE, OF MEDFORD, NEW JERSEY.

AUTOMOBILE LAMP-MOVING MECHANISM.

1,002,490.   Specification of Letters Patent.   Patented Sept. 5, 1911.

Application filed January 11, 1911. Serial No. 602,000.

*To all whom it may concern:*

Be it known that I, REGINALD C. BOGUE, a citizen of the United States, residing at Medford, in the county of Burlington and State of New Jersey, have invented certain new and useful Improvements in Automobile Lamp-Moving Mechanism, of which the following is a specification.

My invention relates to improvements in automobile lamp moving mechanism, the object of the invention being to provide improved means which compel the lamps to move as the steering wheels are moved, so as to throw the light in the direction in which the automobile is turning.

A further object is to provide improved mountings for the lamps which permit their pivotal movement, and provide means compelling their simultaneous pivotal movement with the angular movement of the steering wheels, and provide improved means for locking the lamps against movement.

With these and other objects in view, the invention consists in certain novel features of construction, and combinations and arrangements of parts described, as will be more fully hereinafter described and pointed out in the claims.

Figure 1:
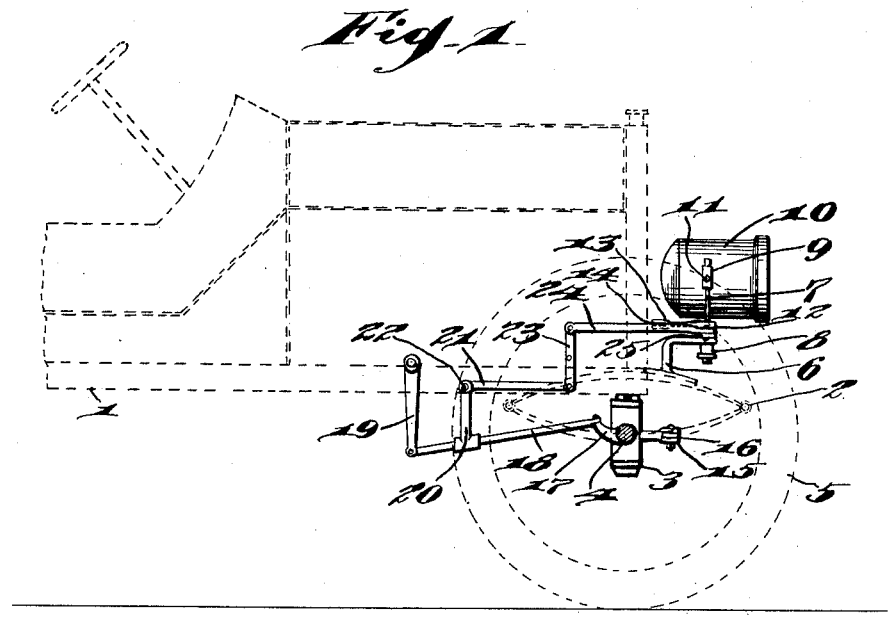
Figure 2:
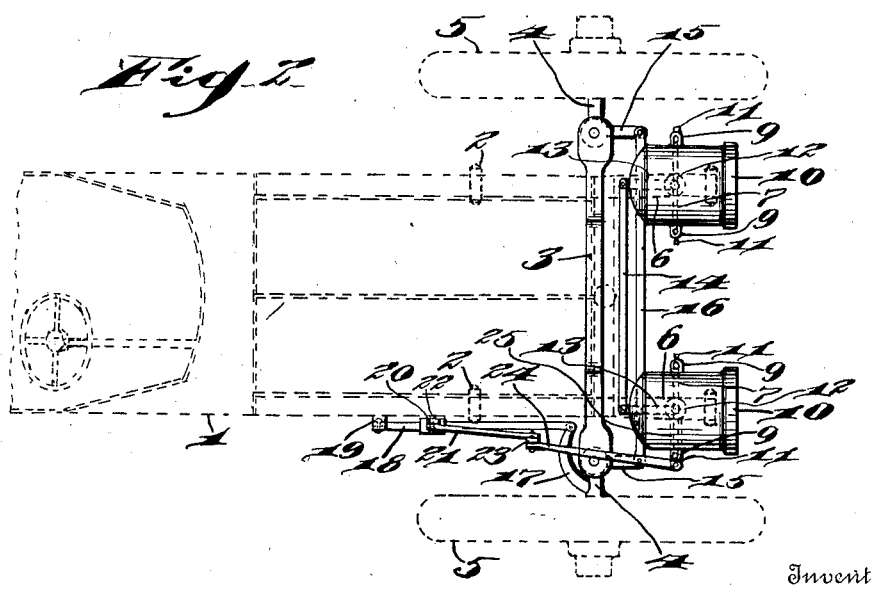

In the accompanying drawings: Figure 1, is a view in side elevation illustrating my improvements. Fig. 2, is a top plan view. Fig. 3, is a view in end elevation. Fig. 4, is a fragmentary perspective view illustrating one of the lamp supports. Fig. 5, is an enlarged view in section illustrating one of the connections in the operating mechanism, and Fig. 6, is a view showing the lamp turning means locked against movement.

In Figs. 1, 2, and 3, the parts of an ordinary automobile are shown in dotted lines, in which 1 is the frame of the body supported on springs 2, the latter mounted on an axle 3 having the ordinary hinged stubs 4 supported in steering wheels 5. On the springs 2, brackets 6 are secured and afford pivotal mountings for forks 7, which are held against movement by nuts or collars 8. These forks 7 enter sleeves 9 in the sides of the lamps 10, and are secured by set screws 11. To each of these forks, collars 12 are secured and are provided with rearwardly projecting arms 13, said arms connected by a link 14, which compels the lamps to turn in unison.

The stubs 4 above referred to are provided with forwardly projecting crank arms 15, which are connected by a link 16, compelling the steering wheels to move in unison. One of the stubs 4 is provided with a rearwardly and inwardly curving arm 17, which is connected by a rod 18 with the lower free end of a lever 19, the upper end of said lever being pivotally secured at its upper end to frame 1. On this rod 18, an upwardly projecting arm 20 is fixed. This arm 20 is connected to a link 21 by means of a screw 22, as will be more fully hereinafter described. This link 21 is connected at its forward end at the lower end of a lever 23, which latter is fulcrumed between its ends on frame 1, and its upper end is connected by a link 24 with a laterally projecting arm 25 on collar 12, so that when the steering wheels turn, the forks 7 will be caused to turn and throw the light in the direction in which the vehicle is moving.

The connection between arm 20, link 21, and frame 1 is best shown in Fig. 5. Arm 20 is provided with an opening larger than the diameter of the screw 22, and link 21 is provided with a screw-threaded opening to receive the screw, hence, in operation the screw revolves in arm 20. Frame 1, however, is provided with a screw-threaded opening 26, so that link 21 may be secured to the frame by means of the screw 22 when disconnected from arm 20, said arm 20 and link 21 both being countersunk to receive the head of the screw. It will therefore be noted that whenever desired, arm 20 may be disconnected from link 21, and the link 21 secured to the frame 1, so that the steering mechanism may be operated while the lamps are held against movement, as this is desirable during the day when the lights are not needed.

It will be noted that my improvements may be attached to any ordinary construction of steering mechanism, and hence may be applied to automobiles in use, and that the apparatus is extremely simple, comparatively inexpensive, yet strong and durable in use.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what

I claim as new and desire to secure by Letters Patent is:

1. In a mechanism of the character described, the combination with pivoted axle stubs, of supports, lamp holding forks pivotally mounted in said supports, crank arms on said forks, a link connecting said crank arms compelling the lamps to turn together, a second crank arm on one of said forks, a crank arm on one of said stubs, a lever pivotally supported at one end, a rod connecting said lever and said last-mentioned crank arm, a lever fulcrumed between its ends, a link connecting one end of said lever with the arm on a lamp fork, a rigid arm on said rod, and a link pivotally connecting said last-mentioned arm with the other end of said lever fulcrumed between its ends, substantially as described.

2. In a mechanism of the character described, the combination with pivoted axle stubs, of supports, lamp holding forks pivotally mounted in said supports, crank arms on said forks, a link connecting said crank arms compelling the lamps to turn together, a second crank arm on one of said forks, a crank arm on one of said stubs, a lever pivotally supported at one end, a rod connecting said lever and said last-mentioned crank arm, a lever fulcrumed between its ends, a link connecting one end of said lever with the arm on a lamp fork, a rigid arm on said rod, a link pivotally connecting said last-mentioned arm with the other end of said lever fulcrumed between its ends, and means connecting said last-mentioned arm and link, which means consist of a locking means which may lock said last-mentioned link against movement when the same is disconnected from the arm, substantially as described.

In testimony whereof I have signed my name to this specification in the presence of two subscribing witnesses.

REGINALD C. BOGUE.

Witnesses:
  R. H. KRENKEL,
  E. E. BOGUE.

---

Copies of this patent may be obtained for five cents each, by addressing the "Commissioner of Patents, Washington, D. C."